United States Patent [19]

Besson et al.

[11] Patent Number: 4,548,098

[45] Date of Patent: * Oct. 22, 1985

[54] HYDROMECHANICAL TRANSMISSION COMPRISING A HYDROKINETIC COUPLER WHEN NECESSARY IN PARTICULAR FOR DIRECTION OF TRACKED VEHICLES

[75] Inventors: Bernard Besson, Orsay; Jacques Guernet, La Celle Saint Cloud, both of France

[73] Assignee: Societe Anonyme de Vehicules Industriels et d'Equipements Mecaniques (SAVIEM), Suresnes, France

[*] Notice: The portion of the term of this patent subsequent to Oct. 22, 2000 has been disclaimed.

[21] Appl. No.: 952,251

[22] Filed: Oct. 16, 1978

[30] Foreign Application Priority Data

Oct. 10, 1977 [FR] France .............................. 77 30454

[51] Int. Cl.⁴ ........................................... F16H 47/04
[52] U.S. Cl. ...................................... 74/687; 74/682; 74/688; 180/6.44
[58] Field of Search ................ 74/664, 720, 682, 687, 74/688; 180/9.2 R, 6.44

[56] References Cited

U.S. PATENT DOCUMENTS

| | | | |
|---|---|---|---|
| 3,248,969 | 5/1966 | Gsching | 74/664 |
| 3,664,128 | 5/1972 | Heyl | 74/720 |
| 3,990,327 | 11/1976 | Margolin | 74/720 |
| 3,994,352 | 11/1976 | Siorek | 180/9.2 R |
| 4,147,075 | 4/1979 | Rasman et al. | 74/720 |

Primary Examiner—Stephen C. Bentley
Attorney, Agent, or Firm—Kerkam, Stowell, Kondracki & Clarke

[57] ABSTRACT

Power is transmitted by motor shaft 9 in derivation by means of an epicycloidal train of engaged gears 21 to the hydrostatic system 15 mounted in parallel to the mechanical transmission 16 which comprises an inverter 24 upstream of the output of hydrostatic motor 20. A hydraulic coupler 25 controlled by structure 26 is mounted in parallel to the epicycloidal train of derivation of force 21 in a fashion to permit the addition of a supplementary couple in difficult situations.

The hydromechanical system of the invention conserves the qualities of flexibility of the hydrostatic system while improving the efficiency of the transmission.

Application to the transmission of direction of tracked vehicles.

9 Claims, 4 Drawing Figures

HYDROMECHANICAL TRANSMISSION COMPRISING A HYDROKINETIC COUPLER WHEN NECESSARY IN PARTICULAR FOR DIRECTION OF TRACKED VEHICLES

The present invention has for object a combined hydromechanical hydrostatic/mechanical transmission providing a continuous variation of the ratio of speeds between an input shaft and an output shaft as well as the inversion of direction of rotation of the output shaft. The transmission can be eventually completed by a hydraulic coupler when necessary of which the operation is controlled by the conditions of functioning of the hydrostatic elements of the transmission. Such transmissions utilizing a so called coupled output system constituted by a mechanical transmission and a hydrostatic converter comprising a hydrostatic pump and a hydrovolumetric motor have already been utilized in different industrial applications such as machine tools, handling equipment, ship yard vehicles, etc.

Further, the change of direction of tracked vehicles or vehicles having non-steerable wheels requires driving at a different speed the driving shafts of the tracks or of the wheels right and left. In such an application transmissions have already been used of the type with superposition of speeds in which each track is driven by a differential of which a shaft is connected to the motor shaft of the drive engine through a speed translation gear box of the vehicle. The other shaft of each of these differentials is connected to a steering shaft which is connected to the output shaft of the engine through the intermediary of a direction changer. The steering shaft is driven in rotation only when the vehicle changes direction, the shaft remaining motionless when the vehicle progresses in a straight line, the tracks being then solely driven through the translation gear box.

In most of the steering transmissions of known type for tracked vehicles, the variation of direction is constituted by a purely hydrostatic assembly. Taking count of the forces required in this transmission to carry out movement over difficult terrain, the hydrostatic elements present the inconvenience of great size and great weight. Further, the manufacture of such a hydrostatic assembly is relatively weak with respect to that provided by a purely mechanical transmission.

It has also been proposed (DTOS No. 1.480.725) to conserve the advantages of the hydrostatic assembly which assures precise control of the speed of rotation of the steering shaft, while suppressing a part of these inconveniences, to mount in parallel on the hydrostatic system, a hydraulic coupler constituting a passage of hydrokinetic power which is susceptible to increase the value of the couple furnished at the desired moment, in difficult situations. The placing in operation of this coupler when necessary is controlled by the conditions of operation of the hydrostatic system.

In such a mode of realization, the normal power transmitted by the hydrostatic converter depends essentially on the elements which make it up. It is thus in particular that for a given pressure of hydraulic fluid in the converter, the torque of the output shaft depends solely on the volume of the hydraulic motor cylinder which constitutes the receiver of the hydrostatic converter. All increase of required capacity necessitates in consequence the functioning of the hydrostatic coupler when necessary.

Further, the directional transmissions in accordance with this known embodiment requires the use of two hydraulic couplers, each coupler being placed in operation to carry out the change of direction.

The present invention has for object a hydromechanical transmission of which the structure conserves the qualities of flexibility of the hydrostatic system while improving the efficiency of the transmission and permitting the obtaining of a supplementary torque or extra torque at the desired moment.

The transmission in accordance with the invention permits the obtaining of superior effeciency to that of a purely hydrostatic transmission in which the force is hydraulically transmitted. In the transmission in accordance with the invention in effect, an important part of the power is transmitted directly by the mechanical path the totality of the power being even transmitted mechanically for the maximum output speed.

The invention also has for object the addition to such a hydromechanical transmission of a hydraulic coupler when necessary which can be utilized for the two directions of rotation of the output shaft and which is placed in operation in accordance with the conditions of operation of the hydrostatic converter.

In accordance with the invention, the hydromechanical transmission permits the continuous variation of the ratio of the speeds between an input shaft and an output shaft as well as the change of the direction of rotation of the output shaft comprising in combination a torque output system constituted by a mechanical transmission and a hydrostatic converter and means for reversal of rotation incorporated in the mechanical transmission.

The hydrostatic converter constituted by a hydrostatic pump and a hydrostatic motor with variable cylindrical capacity or displacement has for function on one hand to transmit a part of the power and on the other hand to control the speed of rotation of the output shaft. The torque is transmitted in superposition by the hydrostatic converter and the mechanical transmission.

The output speed depends essentially on the cylindrical volume of the pump of the hydrostatic converter which permits assurance of precise control. A sharp increase of the displacement cylindrical capacity of the pump causes, taking count of inertias, the appearance of a surpressure in the hydraulic circuit of the converter and a throttling process which entrains a degradation of the power transmitted by the hydrostatic path. By reaction the torque transmitted directly by the mechanical path is increased and there results on the output shaft a supplementary torque or extra torque.

In a preferred embodiment of the transmission in accordance with the invention, it comprises further a hydraulic coupler when necessary mounted in parallel to the mechanical transmission and provided with control means depending on the conditions of operation of the hydrostatic converter. To conserve the control of the speed of the output shaft by the hydraulic system, the maximum torque transmitted by the hydraulic coupler is preferably less than the torque transmitted by the hydromechanical system to the coupled output. The control of the hydraulic coupler can be caused for example by means of a friction coupling, the coupler being of the type with constant charge. It is also equally possible to provide a hydraulic coupler with variable filling of which the control then occurs by the filling.

Finally, to permit change of the direction of rotation of the output shaft, the transmission in accordance with the invention comprises preferably means for reversal mounted in the mechanical transmission between the pump and the receiver of the hydrostatic converter.

Thanks to the particular mounting of these reversal means these then act only on the mechanical path, the inversion of the direction of rotation of the hydrostatic path being obtained by inversion of the hydraulic flow due to the modification of the cylinder capacity of the pump. In these conditions and thanks to the mounting of the coupled output, the functioning of the reversal means is found to be greatly facilitated being given that in the neighborhood of the zero speed of the output shaft, the major part of the power is transmitted by the hydrostatic converter. The maneuvers of the reversal means can thus occur under weak torque and low speed.

In the case where the hydromechanical transmission of the invention comprises a hydraulic coupler when necessary the reversal means are preferably mounted in the mechanical transmission downstream of the hydraulic coupler. This arrangement permits the use of the same hydraulic coupler for the two directions of rotation of the output shaft.

The control of the transmission of the invention is carried out by action on the respective cylinder capacities of the pump and of the hydrostatic converter motor. In accordance with the way in which this control is carried out it is possible to obtain different values of couple on the output shaft as a function of its speed of rotation.

In accordance with an embodiment of the transmission of the invention this comprises means for control of the respective cylinder capacities of the pump and of the receiver of the hydrostatic converter susceptible to decrease the cylindrical volume of the receiver without entraining change of sense of rotation of the receiver when the cylinder capacity of the pump is increased from a speed of the output shaft of zero up to the maximum speed of the output shaft.

In another embodiment these control means of the cylinder capacities respectively of the pump of the receiver allows for maintaining the cylinder capacity of the receiver at its maximum constant value from a speed of the output shaft of zero up to a substantially average speed of the output shaft, the cylinder capacity of the receiver being then decreased up to that where the speed of the output shaft reaches its maximum value. The control means permit at the same time to increase the cylinder capacity of the pump up to its maximum value from a speed of the output shaft of zero up to a substantially average speed of the output shaft and to maintain the cylindrical volume of the pump at its constant maximum value up to the speed of rotation of maximum of the output shaft. In this embodiment of the control larger values are obtained of the couple in the vicinity of the average speeds of rotation of the output shaft which can prove more interesting in certain uses.

When the hydromechanical transmission in accordance with the invention is applied to a transmission for direction of tracked vehicles or non-steerable wheels, the heat motor of the vehicle drives the tracks or the wheels through a speed box and differentials. In accordance with the invention, the planetaries of these differentials are then connected to the motor shaft through a hydromechanical transmission in accordance with the invention of which the output shaft constitutes the direction shaft.

The present invention will be better understood by study of an embodiment described in detail as an example and not limiting illustrated by the accompanying drawings in which.

Figure 1:
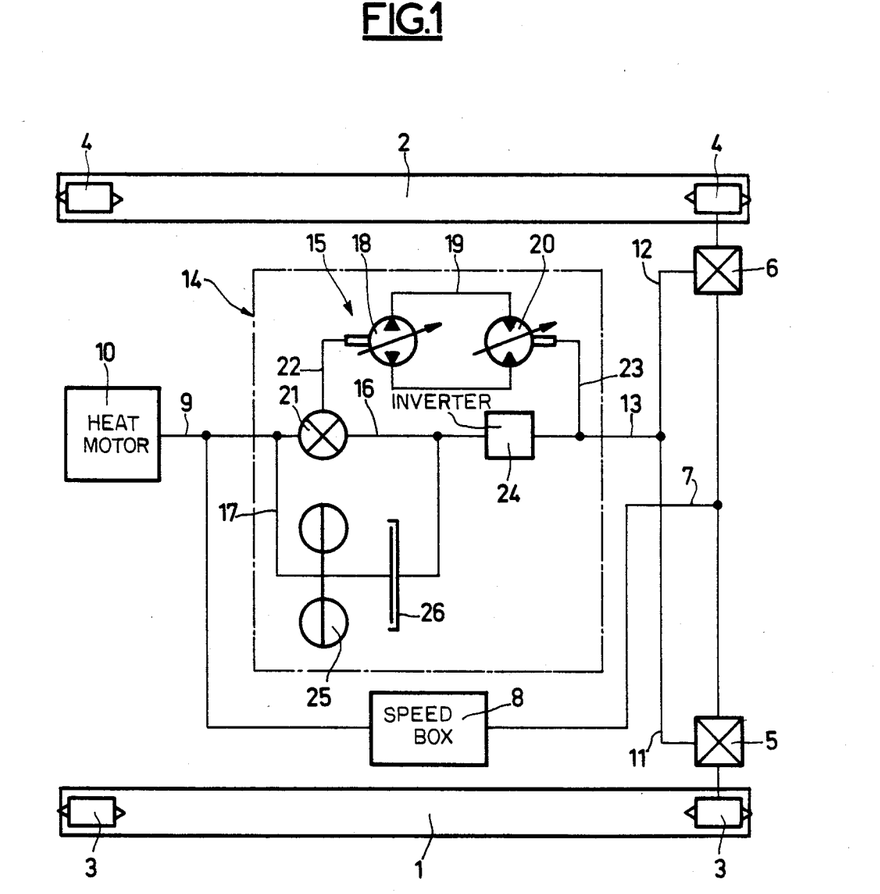
FIG. 1 is a partial schematic view of a hydromechanical transmission in accordance with the invention applied to the control of direction of a tracked vehicle and showing in schematic manner the principle members of the transmission.

In the embodiment shown in FIG. 1, the invention is applied by way of non-limiting example to the direction of a tracked vehicle. The tracks 1 and 2 are driven by wheels 3 and 4 connected by differentials 5 and 6 to the output shaft 7 of a speed box mechanism 8 of translation connected to motor shaft 9 of heat motor 10.

The other shafts 11 and 12 of the differentials 5 and 6 are driven by a shaft of direction 13 which is connected to motor shaft 9 through a direction varying apparatus 14 in its assembly and which comprises a hydromechanical transmission in accordance with the invention. When the vehicle moves in straight line, the shaft of direction 13 does not rotate and the power is transmitted to tracks 1 and 2 exclusively by the speed box of translation 8. If it is desired to carry out a change of direction, the shaft of direction 13 is driven in a sense or in the other in accordance with the direction of change in such a way as to superpose, by means of the differentials 5 and 6, the movement of rotation to the wheels 3 and 4 driving the tracks 1 and 2 and accelerating one of the tracks with respect to the other which causes change of direction of the vehicle.

The variator 14 constituting the transmission of direction comprises several paths of transmission of power between motor shaft 9 and direction shaft 13: the hydrostatic path 15, a mechanical path 16 and a hydrokinetic path when necessary 17.

The transmission of the invention comprises a coupled output system constituted by a mechanical transmission 16 and a hydrostatic converter 15 comprising a hydrovolumetric pump with variable cyclinder capacity 18 connected by a hydraulic circuit 19 to a receiver constituted by a hydrovolumetric motor also with variable cylinder capacity 20.

The derivation of power is realized by means of an epicycloidal train of engaged gears in which one of the shafts is connected to motor shaft 9 the two other shafts driving respectively the input shaft 22 of the pump with variable cylinder capacity 18 and the mechanical transmission 16. The output shaft 23 of motor 21 also drives the shaft of direction 13. The continuous variation of speed of the shaft of direction 13 is obtained by control of the cylindrical volumes of pump 18 and of motor 20 of the hydrostatic converter 15. The inversion of the direction of movement necessitates the addition of an inverter 24 mounted in the mechanical transmission 16 in parallel to the hydrostatic converter 15. The inversion of the direction of rotation of the output shaft 23 of hydrostatic motor 20 is obtained by inversion of the hydraulic flow following a modification of the cylindrical volume of pump 18. The inverter 24 thus acts only on the mechanical path 16 thanks to its mounting upstream of the point of attack of direction shaft 13 by the output shaft 23 of motor 20.

One conceives that it should be possible to provide the mounting of the inverter upstream or downstream of the assembly of the coupled output system but that the preferred position represented in the figure and which will be described presents the advantage of facilitating the functioning of the inverter. In effect, in the mounting at the coupled output, in the neighborhood of the speed of zero rotation of shaft 13, the quasitotality of the power is transmitted by the hydrostatic path 15 with the result that the charge and speed of rotation of the mechanical path 16 are very low, the maneuver of the inverter then occurring under weak couple and low speed.

The hydrokinetic path 17 is constituted by a hydraulic coupler when necessary 25 which can be controlled in the illustrated example by a friction mechanism 26, the assembly of the hydrokinetic path 17 being mounted in parallel to the mechanical path 16 and more particularly in parallel to the train of epicycloidal engaged gears 21 for derivation of power. In the illustrated example, the hydraulic converter 25 is of constant fill which necessitates for its control the use of a coupling 26. One will understand that it would be possible to replace these means by a hydraulic coupler with variable filling of which the control would then be carried out through the intermediary of filling.

When the hydraulic coupler 25 is controlled, that is to say here when the mechanism 26 is closed, a supplementary torque or surcouple is furnished to the direction shaft, the control of speeds being however always conserved by the hydrostatic path 15 and the command of the cylindrical volume of pump 18.

Figure 2:
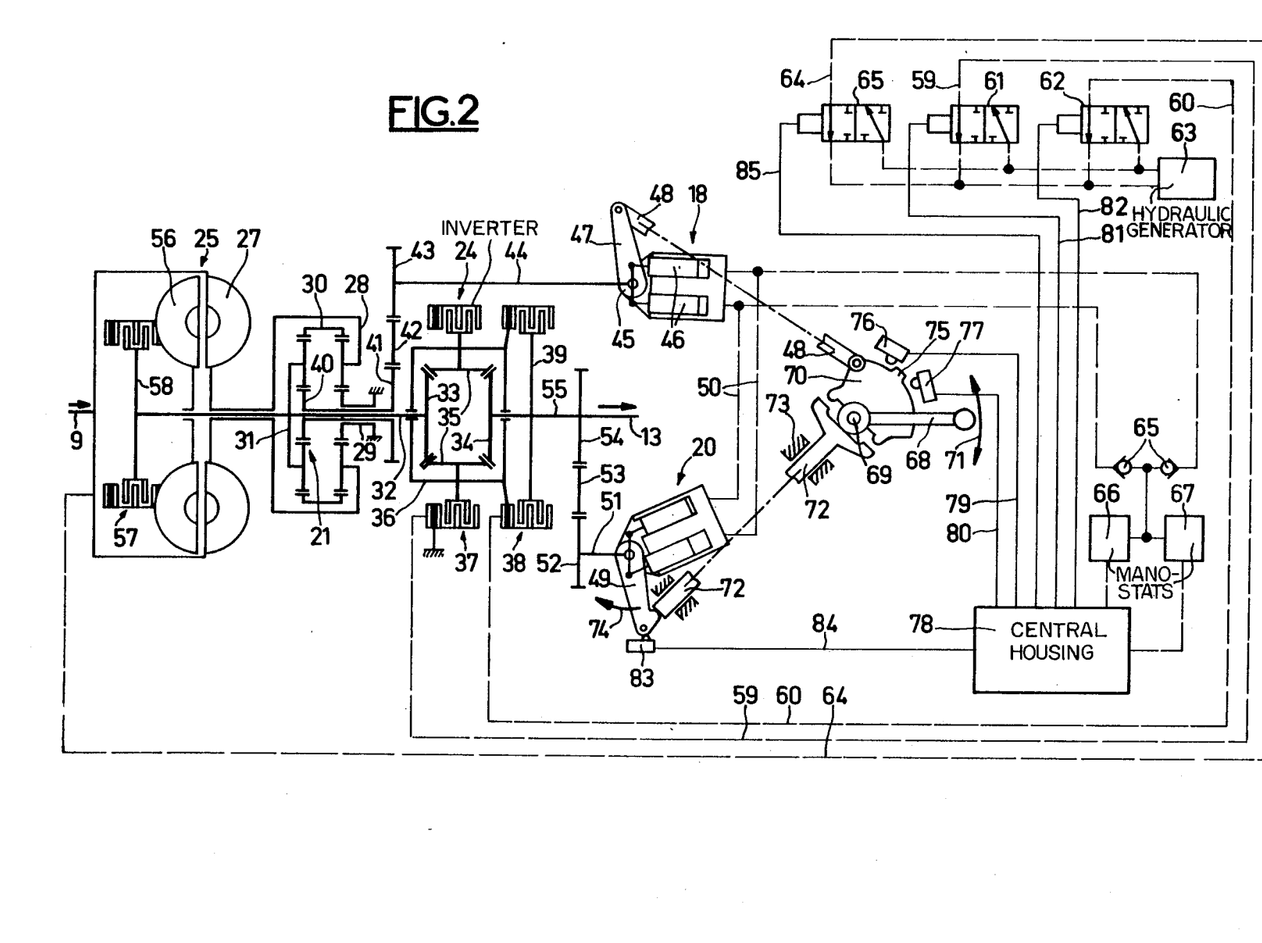
FIG. 2 is a schematic view of a transmission in accordance with the invention explaining the disposition of the different principle elements and showing by way of example the control means of the different elements.

FIG. 2 illustrates more particularly the different principle elements of the hydromechanical transmission referenced at 14 in its assembly in FIG. 1. One finds in FIG. 2 the input shaft or motor shaft 9 and the output shaft or direction shaft 13 in which the transmission in accordance with the invention allows to vary continuously the speed of rotation and change in direction of rotation. Identical elements carry the same references as in FIG. 1.

Input shaft 9 drives pump 27 of the hydraulic coupler 25 as well as the planetary carrier 28 of an epicycloidal multiplier of which the sun gear 29 is fixed and of which the external crown 30 is common to that of the epicycloidal train of engaged gears 21 of derivation of power seen equally in FIG. 1. The carrying satellite 31 of the epicycloidal train 21 is connected to the input shaft 32 of inverter 24. In the example illustrated in FIG. 2, inverter 24 is constituted by way of example by a differential with conical couples of which one of the planetaries 33 is connected to input shaft 32, the other planetary 34 being connected to output shaft 13. The axes of the two satellites 35 are supported by the exterior crown 36 which can be immobilized in rotation by means of a multi-disc friction connection 37 solid with casing of the transmission. The exterior crown 36 is moreover solid with a second friction structure with multi-discs 38 of which the driven part 39 is directly connected to output shaft 13.

The planetary 40 of epicycloidal train 21 is connected through the intermediary of pinions 41, 42 and 43 to the drive shaft 44 of rotating plateau 45 of the hydrovolumetric pump with variable cylinder capacity 18. Pump 18 is constituted by a hydrostatic element with axial pistons 46 displaced in a cylinder block rotating around an inclined axis with respect to the principle axis 44 carrying plateau 45. The inclination of the cylinder block varying the cylindrical capacity of pump 18 is controlled by lever 47 controlled by the connecting arm 48.

The hydrovolumetric motor with variable cylindrical capacity 20 is made up in the same manner as pump 18 by a hydrostatic element with axial pistons of which the cylinder block can be more or less inclined under the action of a push lever 49. Pump 18 is connected to motor 20 by hydraulic ducts 50 which bring the hydraulic fluid from the pump toward the motor and viceversa. The output shaft 51 of motor 20 is connected by toothed pinions 52, 53 and 54 to the output shaft 13 and further connected to the output 55 of inverter 24.

Turbine 56 of hydraulic coupler 25 is connected to the friction multi-disc structure 57 of which the driven part is connected directly to the input shaft 32 of inverter 24. When the multi-disc structure 57 is closed turbine 56 of coupler 25 drives directly shaft 32 thus causing the direct addition of a supplementary couple or surcouple.

The couplings 38 and 37 controlling inverter 24 are hydraulically actuated by the intermediary of the ducts 59 and 60 by the electrovalves with three paths and two positions 61 and 62 fed by hydraulic fluid under pressure from hydraulic generator 63. The control coupling 57 of coupler 25 is controlled hydraulically by the intermediary of the duct 64 by the electrovalve 65 with three paths and two positions also fed with hydraulic fluid under pressure by generator 63.

The ducts 50 of the hydraulic circuit connected to pump 18 and the motor 20 discharge equally through the intermediary of two antireturn valves 65 to manostats 66 and 67 acting as pressure sensors susceptible to detect the pressure of the hydraulic fluid in the hydraulic converter. Manostat 66 detects the minimum pressure and manostat 67 the maximum pressure in the hydraulic circuit. Manostats 66 and 67 deliver an output signal when these pressures pass predetermined values for the maximum and minimum pressures.

The control of the respective cylinders of pump 18 and of motor 20 which determine the speed of rotation of output shaft 13 can be carried out in different ways.

FIG. 2 represents by way of example an embodiment which is possible for such control. In this embodiment control of speed of rotation of output shaft 13 is carried out by aid of a control lever 68 articulated around an axis 69 and acted upon by a double tumbler 70 with rotation in one or the other directions of the double arrow 71. Tumbler 70 carries an axis of articulation for the lever 48 further articulated to lever 47 of control of the cylinder volume of pump 18. When tumbler 70 undergoes such rotation it acts on a push rod 72 which displaces in translation with respect to fixed support 73 and causes a rotation of lever 49 in the direction of arrow 74 which tends to decrease the cylindrical volume of motor 20 without inverting the direction of rotation of it. One will note that thanks to the disposition of the double tumbler 70, this action on push rod 72 causing a reduction of the cylindrical volume of motor 20 exists for the two directions of rotation of tumbler 70 and of lever 68 controlling either an increase or a decrease of the cylindrical volume of pump 18.

The rotatable tumbler 70 further carries a stop 75 on its periphery susceptible of entering in alternate contact with electrical contacts 76 or 77 sending a signal to the central housing 78 to control through the intermediary of electrovalves 61 and 62 the closing of structures 37 or 38. To this end, the contacts 76 and 77 are connected to the central housing 78 by electrical connections 79 and 80 while the electrovalves 61 and 62 are connected to housing 78 by electrical connections 81 and 82.

Electrical contact 83 can deliver a signal to the central housing 78 by electrical connection 84 when it is acted upon by the extremity of lever 49 controlling the displacement of motor 20 and in accordance with the position of this lever. This signal causes, through the intermediary of central housing 78 an action on valve 65 connected to this housing by the electrical connection 85 causing by this reason the closing of the structure 57 and the functioning of hydraulic coupler having constant filling 25.

Figure 3:
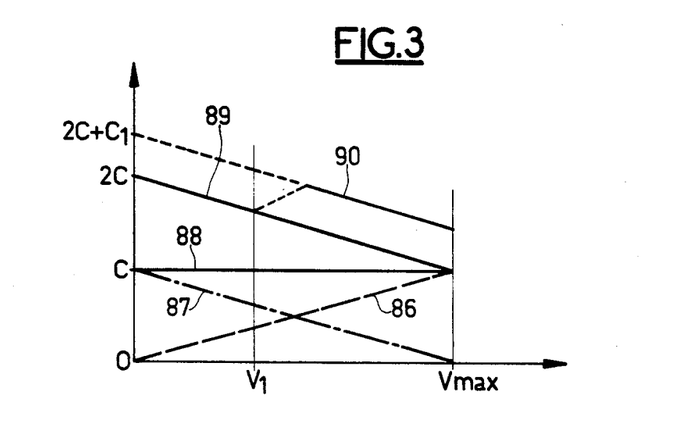
FIG. 3 shows curves illustrating the variation of the output couple of the transmission of the speed of rotation of the output shaft in accordance with a first method of control.
Figure 4:
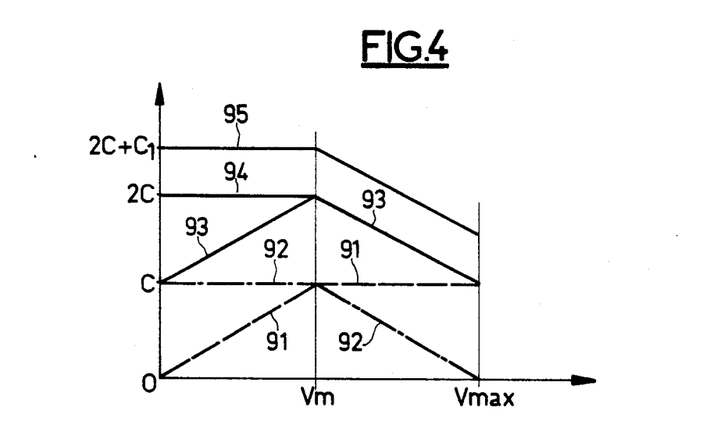
FIG. 4 shows curves analagous to those of FIG. 3 in accordance with another of method of control permitting the attaining of larger couples in the neighborhood of average speeds.

FIGS. 3 and 4 illustrate different possibilities of control of the transmission in accordance with the present invention as a function of the control of the respective cylinders of the pump and of the receiver of the hydrostatic converter.

Firstly, this functioning will be described without reference to the action of the hydraulic coupler when necessary 25. In a first situation, corresponding to a slow action, one proceeds to a progressive increase of the cylinder capacity of pump 18 of the hydrostatic converter. The increase of the cylindrical capacity of the pump as a function of the speed of rotation of the output shaft is referenced 86 on FIG. 3 and shown in broken line. The direction of rotation of the output shaft is fixed by the position of pump 18 with variable flow as well as by the control of the structures of the inverter 24. For a zero speed, inverter 24 which can ultimately be braked can assure the braking of output shaft 13.

The displacement of hydraulic motor 20 connected to output shaft 13 of the mechanism is controlled at the same time in such a way as to decrease progressively as required as the speed of rotation of the output shaft increases. This variation is represented at the right in mixed lines 87 on FIG. 3.

Taking account of the theoretical law of equality of flows of the pump and of the hydrostatic motor, torque C is constant on all the range of speed as represented by line 88 on FIG. 3.

During the progressive establishment of the speed, the torque is entirely transmitted by the hydrostatic motor 20. As the output shaft 13 takes the speed, the torque transmitted by hydrostatic motor 20 decreases while the proportion of the torque transmitted by the mechanical path through the intermediary of the inverter 24 increases. The transmitted power increases proportionally to the speed of rotation of the output shaft, the fraction transmitted by the hydrostatic path being more and more weak. For the maximum speed $V_{max}$ of the output shaft, the total of torque C and of the power are transmitted by the mechanical path and the inverter 24. The power transmitted is also maximum.

In a second situation, during corresponding operation to a rapid mode of action, the cylindrical capacity of pump 18 is rapidly increased. Taking count of the inertias in the hydrostatic converter, there appears in the hydraulic circuit a surpressure and a throttling of hydraulic fluid which entrains a degredation of power. By reaction on the epicycloidal gear of derivation of power 21, the torque transmitted directly by the mechanical path is increased and there results a supplementary torque on the output shaft 13. This supplementary torque is maximum for zero speed of the output shaft 13 and can reach the same value as the nominal torque C. The curve of variation of the output torque as a function of the speed of rotation of the output shaft for this type of action is shown by line 89 of FIG. 3 where one sees that the torque varies from the value 2C for zero speed up to the value C for maximum speed.

When for the operation of the vehicle or for the organ which receives the transmission, it is necessary to obtain a torque on the output shaft of the transmission greater than the torque obtained by the preceding piloting, the hydraulic coupler when necessary 25 is utilized in parallel with the mechanical transmission. The torque transmitted by this hydrokinetic path is $C_1$ which is preferably less than the torque C transmitted by the hydromechanical path to conserve the control of speed by the hydrostatic converter. Coupler 25 is preferably put in action in a selective manner when the speed of output reaches a sufficient value $V_1$ such as to obtain an acceptable slippage. When the conditions of operation represented for example by the pressure in the hydraulic circuit in the hydrostatic converter detected by the captors 66 and 67 correspond to this limit speed $V_1$, the coupler when necessary 25 is put in action through the structure 57. The couple obtained is represented by line 90 on FIG. 3 which is constituted by a portion of the line 89 having undergone a translation toward the larger couples of a value equal to $C_1$.

FIG. 4 shows control possibilities different for the cylinders of the pump and of the motor of the hydrostatic converter for obtaining larger values for the output couple in the neighborhood of average speeds $V_m$.

In this case, the cylindrical volume of pump 18 is first increased up to that where the speed of rotation has attained the average speed $V_m$. The cylindrical volume of the pump is then maintained at its constant maximum value. The variation of the cylindrical capacity of pump 18 is shown in interrupted line 91 on FIG. 4. Control of the cylindrical volume of motor 20 is made in such a way that its capacity is maintained at its maximum value from zero speed up to average speed $V_m$ of the output shaft then decreased up to the maximum speed as shown in mixed lines by line 92 in FIG. 4. The couple obtained which is equal to the nominal couple C for zero speed increases up to the double value 2C for average speed $V_m$ for decrease then up to the nominal value for the maximum speed as shown by curve 93 of FIG. 4.

This curve which represents a functioning during a slow or progressive action on the cylindrical volume of the pump can be replaced by curve 94 for maintaining the output couple at a double value of the nominal value from zero speed up to average speed $V_m$ by acting in a brusque way on the control of the cylindrical volume of the pump to create a regime of throttling in the hydraulic circuit of the hydrostatic converter and to obtain a supplementary couple as above.

It is also possible to utilize the hydrokinetic coupler when necessary 25 this time from the low speeds of rotation of the output shaft to obtain curve 95 for which the couple maintains a constant value equal to $2C+C_1$ from zero speed up to average speed $V_m$ for decrease then to the value $C+C_1$ for maximum speed.

The hydromechanical transmission of the present invention has numerous advantages with respect to a purely hydrostatic transmission in which all the power is transmitted hydraulically. In the hydromechanical transmission in accordance with the invention in effect, the efficiency is superior since an important part of the power is transmitted directly by the mechanical path, the power being integrally transmitted by the mechanical system to maximum speed. In the hydromechanical transmission of the invention, the hydrostatic elements which are necessary can be of smaller dimension than those that would be utilized in a purely hydrostatic transmission.

Further, the addition of a hydrokinetic supplementary path when necessary provides an increase of the possibilities of the transmission which is limited only by the necessity to converse the control of the output speed by the hydrostatic system. The different commands possible for the hydrostatic converter permit the increase in important way of the performances of the transmission with respect to a purely hydrostatic transmission.

Finally, it is possible to obtain a supplementary power and a supplementary couple by throttling in the circuit of the hydrostatic converter by controlling in appropriate manner the cylinder of the pump of the converter.

Further, as has been seen, the particular arrangement of the inverter of the transmission in accordance with the present invention allows this to function at zero speed and under very weak couple in normal hydromechanical functioning and the half of the output couple in regime of throttling in the hydraulic circuit of the hydrostatic converter for which the couple transmitted by the mechanical path is more important.

The transmission of the present invention can be utilized in all industrial applications which require the variation of the ratio of speed between an input shaft and an output shaft between equal values and opposite sign including therefor equally the inversion of the direction of rotation in the range of functioning. Such a transmission is notably and particularly suitable to assure the transmission of direction to tracked vehicles.

We claim:

1. A hydromechanical transmission for driving at continuously variable speed in one direction and reverse direction a steering shaft connected to planetary gear units for transforming torque from an engine to driven wheels respectively engaging both tracks of a tracked vehicle, said transmission comprising in combination:

a gear transmission means connecting an output shaft of said engine to said steering shaft and including a main power dividing planetary gear unit having a first output shaft bearing a sun gear member and a second output shaft connected with planet pinions and reversal means connected to said second output shaft for controlled reversal of the rotation of said steering shaft;

a hydrostatic mechanism comprising a hydrostatic pump unit and a hydrostatic motor unit in a closed hydrostatic circuit and means for varying displacements of said hydrostatic pump unit and said hydrostatic unit, said hydrostatic pump unit being in mechanical driving relationship with said first output shaft of said main planetary gear unit and said hydrostatic motor being in mechanical driving relationship with said steering shaft downstream of said reversal means, whereby a portion of the torque from the engine is transferred hydrostatically and the balance of the torque is transmitted mechanically; and a hydrokinetic coupler unit having a pump member driven by said output shaft of said engine and a turbine member connected to said second output shaft of said main planetary gear unit for selectively transmitting a supplemental torque to said steering shaft.

2. A hydromechanical transmission according to claim 1 including control means for said hydrokenetic coupler dependent on the operational conditions of said hydrostatic mechanism.

3. A hydromechanical transmission according to claim 2 wherein said control means comprise means responsive to the pressure of the hydraulic fluid in said closed hydrostatic circuit for operating said hydrokinetic coupler when the speed of rotation of said steering shaft exceeds a given value.

4. A hydromechanical transmission according to claim 1 including a clutch mechanism connecting said turbine member to said second output shaft and control means dependent on the operational conditions of said hydrostatic mechanism for controlling said clutch mechanism.

5. A hydromechanical transmission according to claim 1 wherein said reversal means comprises a differential gear unit having two sun bevel gears and two planetary bevel gears, two clutch means controlled alternatively for connecting the planetary carrier respectively to the fixed casing of the transmission and also to said steering shaft thereby reversing the direction of rotation of said steering shaft.

6. A hydromechanical transmission according to claim 1 wherein said means for varying displacements of said hydrostatic pump unit and said hydrostatic motor unit decrease the displacement of said motor unit slowly without involving change of direction of rotation of said motor unit, when the displacement of said pump unit is controlled to increase slowly, whereby a rapid increase of the displacement of said hydrostatic pump unit produces a degradation of power within said closed hydrostatic circuit and produces a supplementary torque mechanically transmitted to said steering shaft.

7. A hydromechanical transmission according to claim 1 wherein said means for varying displacements of said hydrostatic pump unit and said hydrostatic motor unit maintains the displacement of said motor unit at its maximum value up to a speed of said steering shaft which is substantially average and then decreased slowly from said average speed when the displacement of said pump unit is controlled to increase slowly up to said average speed and then maintained constant at its maximum value, whereby a rapid increase of the displacement of said pump unit decreases power within said closed hydrostatic circuit and provides a supplementary torque mechanically transmitted to said steering shaft.

8. A hydromechanical transmission for a steering shaft of a tracked vehicle comprising power dividing gear means having a first and a second output shaft, means for changing direction of rotation of said second output shaft connected to said steering shaft, a hydrostatic unit comprising a hydrostatic pump connected to said first output shaft and a hydrostatic motor connected to said steering shaft, means for varying displacements of said hydrostatic pump and said hydrostatic motor thereby varying a torque portion transferred hydrostatically, and a hydrodynamic torque converter mounted in parallel to said power dividing gear means and operating selectively dependent on the operational conditions of said hydrostatic unit.

9. A hydromechanical transmission according to claim 8 further including clutch means for controlling operation of said hydrodynamic torque converter.

* * * * *

UNITED STATES PATENT AND TRADEMARK OFFICE
CERTIFICATE OF CORRECTION

PATENT NO. : 4,548,098

DATED : October 22, 1985

INVENTOR(S) : Bernard Besson and Jacques Guernet

It is certified that error appears in the above-identified patent and that said Letters Patent is hereby corrected as shown below:

On the Cover Page:

The filing date should read:
-- October 6, 1978. --

The Assignees should read:
--Renault Vehicules Industriels (R.V.I.),
Lyon, France, and Le Moteur Moderne,
Boulogne-Billancourt, France --

Signed and Sealed this

Fourth Day of November, 1986

[SEAL]

*Attest:*

DONALD J. QUIGG

*Attesting Officer*    Commissioner of Patents and Trademarks

UNITED STATES PATENT AND TRADEMARK OFFICE
CERTIFICATE OF CORRECTION

PATENT NO.  : 4,548,098
DATED       : October 22, 1985
INVENTOR(S) : Bernard Besson, et al It is certified that error appears in the above-identified patent and that said Letters Patent is hereby corrected as shown below:

On the Cover Page:

The filing date should read:

-- October 6, 1978. --

The Assignees should read:

--Renault Vehicules Industriels (R.V.I.), Lyon, France, and Le Moteur Moderne, Boulogne-Billancourt, France --

This certificate supersedes certificate of correction issued November 4, 1986.

Signed and Sealed this
Second Day of December, 1986

*Attest:*

DONALD J. QUIGG

*Attesting Officer*    *Commissioner of Patents and Trademarks*